United States Patent [19]

Houben

[11] 4,206,053

[45] Jun. 3, 1980

[54] METHOD OF DEWATERING FROTH FINES

[75] Inventor: Heinz Houben, Mönchen-Gladbach, Fed. Rep. of Germany

[73] Assignee: Maschinenfabrik Buckau R. Wolf Aktiengesellschaft, Grevenbroich, Fed. Rep. of Germany

[21] Appl. No.: 930,547

[22] Filed: Aug. 2, 1978

[30] Foreign Application Priority Data

Aug. 4, 1977 [DE] Fed. Rep. of Germany ....... 2735113

[51] Int. Cl.[2] ............................................ B01D 33/06

[52] U.S. Cl. .................................... 210/73 R; 210/75; 210/78

[58] Field of Search ..................... 210/74, 78, 75, 196, 210/194, 372, 73 R

[56] References Cited

U.S. PATENT DOCUMENTS

| | | | |
|---|---|---|---|
| 1,991,490 | 2/1935 | Brewer | 210/78 X |
| 2,752,044 | 6/1956 | Olcott | 210/78 |
| 2,760,639 | 8/1956 | Haverstock | 210/78 X |
| 3,011,647 | 12/1961 | Elsken | 210/196 X |
| 3,737,032 | 6/1973 | Burkitt | 209/172.5 |

*Primary Examiner*—William A. Cuchlinski, Jr.
*Attorney, Agent, or Firm*—Michael J. Striker

[57] ABSTRACT

A method for dewatering froth fines obtained during the separation of coal, in which a discontinuously operating sieve scraping centrifuge is filled with the froth fines, the mixture is centrifuged at a low rotational speed to remove a major portion of the liquid and to deposit a layer of solid material which acts as a filter aid, and the remaining mixture is then centrifuged at a high rotational speed. The first run-off is reintroduced into the centrifuge to reduce its high solids content.

9 Claims, No Drawings

METHOD OF DEWATERING FROTH FINES

BACKGROUND OF THE INVENTION

The invention relates to a method of dewatering the froth fines or flotation concentrates obtained during coal dressing or separation by means of a discontinuously operating sieve scraping centrifuge.

By the dewatering of the froth fines, it is desired to obtain waste water with a low solids content as well as a solid capable of transportation in a noncaking condition.

To this end, there have been employed discontinuously operating scraping centrifuges (magazine "Glück auf", 1969, pages 1135–1146, especially page 1139, right-hand column, first paragraph). Such centrifuges could not achieve wide acceptance because of the high content of solids in the liquid discharge. According to the numerical tables 1 and 2 on pages 1141 and 1142 of the above-mentioned publication, the contents of solids in the discharge amounts to between 42 and 60 grams per liter. As a result of this high solids content, the discharge had to be supplementally treated in filters, substantially increasing the total costs per metric ton of treating the froth fines. This could also be the reason why the profession turned away from the centrifugal dewatering and turned to exclusive filtration dewatering (see page 1142, left-hand column, right paragraph of the above-mentioned publication). Also, up to the present (see the magazine "Glück auf" 1976, pages 385–387 and especially page 385, left-hand column, third paragraph), the filtration dewatering has been generally considered advantageous than the contrifugal dewatering both with respect to the solids content in the discharge as well as in operating costs. Thus, the costs for the mechanical dewatering of the froth fines to a residual moistness of approximately 27% with the utilization of vacuum rotating filters are about 2.50 DM per metric ton. The solids concentration in the discharge achieved thereby is between 15 and 20 grams per liter.

SUMMARY OF THE INVENTION

The invention is based on the task of providing a method of dewatering the froth fines by means of a scraping centrifuge, in which the solids content of the discharge is lowered to the amount customary in filtration dewatering and the operating costs considerably reduced. This goal is achieved by filling the centrifuge with the froth fines to be dewatered at a low rotational speed and then speeding up to the centrifuging rotational speed only after centrifuging off the predominant part of the fluid contained in the froth fines; the first run-off is then returned into the centrifuging drum after the termination of the filling operation.

By resorting to the use of this measure, there is achieved, due to a filtering effect which is maintained independently of the degree of filling, a solids content in the discharge of 5 to 15 grams per liter, at an operating cost ratio of 0.85 DM per metric ton of froth fines to be dewatered.

These substantial advantages are achieved in accordance with the invention in that only minute amounts of the fine grains are being centrifuged during the small filling rotational speed. At a filling rotational speed of about 200 r.p.m., the solids contents in the liquid discharge is at about 40 to 60 grams per liter. Inasmuch as this solids content is too high, the entire first run-off is reintroduced into the filled centrifuging drum prior to the switching to the centrifuging speed of rotation, wherein the filtration cake present in the drum serves as a filtering layer for this run-off. Based on the filtering layer which has by now built up in the centrifuging drum, the liquid discharge retains only the required low solids content, which does not significantly increase even after the speeding up to the centrifuging speed of rotation. As a result of the high centrifuging speed of rotation of at least 870 r.p.m., there is achieved a residual moistness of the filtration cake of approximately 15%, which can be further reduced in by treatment of the filtration layer with superheated steam prior to the emptying. At this low moisture content, further treatment can be dispensed with, so that the dewatered substance is transportable and capable of further treatment without any problems.

In order to be able to avoid the reintroduction of the first run-off, it is proposed according to the invention that a filtering layer of a thickness of several centimeters, advantageously of a 2 to 3 centimeter thickness, always remains in the centrifuging drum during the emptying of the centrifuging drum, as a filtration-aiding layer. This filtration-aiding layer prevents, during the subsequent filling of the centrifuging drum, a too great a proportion of solid substances entering the liquid discharge. By resorting to this operation procedure, there is a solids content of at most 15% in the discharge. Inasmuch as the filtration-aiding layer which remains on the inner sieve surface of the centrifuging drum can become impermeable after several operating cycles, the centrifuging drum is to be emptied to the bare sieve after approximately 10 to 20 operating cycles. In order to avoid the possibility that too much of the solid substance could pass into the discharge during the first operating cycle prior to the formation of a new filtering layer, the first run-off after each complete emptying operation is again reintroduced into the centrifuging drum, in order to achieve the effect which has been previously described.

A scraping centrifuge which can be utilized for dewatering the froth fines is the per se known pendulously suspended sieve cage centrifuge. It has the advantage that unbalanced conditions which occur as a result of a non-uniform loading are automatically compensated for.

I claim:

1. A method of dewatering froth fines, comprising filling a discontinuously operating sieve centrifuge with said froth fines; centrifuging the froth fines at a low rotational speed, thereby removing a first run-off portion of liquid and depositing a layer of said layer acting as a filter aid; and centrifuging a remaining portion of said froth fines at a high rotational speed.

2. A method as defined in claim 1, wherein said centrifuge is a pendulously suspended sieve centrifuge.

3. A method as defined in claim 1, wherein said low rotational speed is about 200 r.p.m.

4. A method as defined in claim 1, wherein said high rotational speed is at least 870 r.p.m.

5. A method of dewatering froth fines, comprising filling a discontinuously operating sieve centrifuge with said froth fines; centrifuging the froth fines at a low rotational speed, thereby removing a first run-off portion of liquid and depositing a layer of solid materials on an inner sieve surface of said centrifuge, said layer acting as a filter aid; centrifuging a remaining portion of said froth fines at a high rotational speed; returning said first run-off portion into said centrifuge; and centrifuging said run-off portion at a high rotational speed, thereby reducing the solids content in said run-off portion.

6. A method as defined in claim 5, wherein said returning of said first run-off portion is effected only after a first operating cycle in a series of said operating cycles.

7. A method as defined in claim 6, wherein said layer of solid materials is maintained at a thickness of between 2 and 3 cm during said series of operating cycles.

8. A method as defined in claim 6, wherein said series of operating cycles comprises about 10 to 20 of said operating cycles, and said layer of solid materials is completely removed after said series of operating cycles.

9. A method as defined in claim 8, further comprising treating said layer of solid materials with superheated steam before removing.

* * * * *